(12) United States Patent
Yeo et al.

(10) Patent No.: US 9,773,108 B1
(45) Date of Patent: Sep. 26, 2017

(54) SYSTEMS AND METHODS FOR PERFORMING OPERATIONS ON RESTRICTED MOBILE COMPUTING PLATFORMS

(71) Applicant: Symantec Corporation, Mountain View, CA (US)

(72) Inventors: Matthew Yeo, Portland, OR (US); Radoslav Stanev, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 72 days.

(21) Appl. No.: 14/620,225

(22) Filed: Feb. 12, 2015

Related U.S. Application Data

(60) Provisional application No. 62/087,228, filed on Dec. 3, 2014.

(51) Int. Cl.
*G06F 21/53* (2013.01)
*H04L 12/24* (2006.01)
*H04W 12/06* (2009.01)
*H04L 29/08* (2006.01)
*H04L 29/06* (2006.01)

(52) U.S. Cl.
CPC .......... *G06F 21/53* (2013.01); *H04L 41/0816* (2013.01); *H04L 63/08* (2013.01); *H04L 63/1416* (2013.01); *H04L 67/1095* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 7,472,242 B1* | 12/2008 | Deshmukh | .......... | G06F 11/1451 711/162 |
| 8,112,505 B1* | 2/2012 | Ben-Shaul | ........ | G06F 17/30168 709/217 |
| 8,539,179 B1* | 9/2013 | Stringham | .......... | G06F 11/1451 711/162 |

(Continued)

OTHER PUBLICATIONS

"Clueful", http://cluefulapp.com/, as accessed Dec. 3, 2014, (Apr. 7, 2012).

*Primary Examiner* — Benjamin Lanier
(74) *Attorney, Agent, or Firm* — FisherBroyles LLP

(57) ABSTRACT

The disclosed computer-implemented method for performing operations on restricted mobile computing platforms may include (1) receiving a request to perform an operation on a mobile device, (2) requesting access to a synchronization profile of the mobile device that represents the current state of the mobile device, (3) receiving access to the synchronization profile, and (4) performing the operation on the mobile device by performing an analogous operation on the synchronization profile. In some examples, the operation may require access to a current state of the mobile device, and a mobile computing platform of the mobile device may place a limitation on the ability of third-party software to (a) inspect the current state of the mobile device, (b) modify the current state of the mobile device, and/or (c) execute resource-intensive operations via the mobile device. Various other methods, systems, and computer-readable media are also disclosed.

20 Claims, 7 Drawing Sheets

(56) References Cited

U.S. PATENT DOCUMENTS

| | | | |
|---|---|---|---|
| 8,666,938 B1* | 3/2014 | Pancholy | G06F 9/455 |
| | | | 707/610 |
| 8,712,968 B1* | 4/2014 | Chester | G06F 11/1417 |
| | | | 707/649 |
| 8,782,792 B1 | 7/2014 | Bodke | |
| 9,021,578 B1 | 4/2015 | Casaburi et al. | |
| 9,380,456 B1* | 6/2016 | Lee | H04W 12/08 |
| 2008/0005611 A1* | 1/2008 | Solyanik | G06F 11/1464 |
| | | | 714/6.12 |
| 2008/0235764 A1* | 9/2008 | Cohen | G06F 21/6281 |
| | | | 726/1 |
| 2009/0118839 A1* | 5/2009 | Accapadi | G06F 21/53 |
| | | | 700/28 |
| 2010/0169554 A1* | 7/2010 | Nakamura | G06F 21/62 |
| | | | 711/103 |
| 2011/0106755 A1* | 5/2011 | Hao | G06F 11/1451 |
| | | | 707/610 |
| 2014/0172783 A1* | 6/2014 | Suzuki | G06F 8/63 |
| | | | 707/609 |
| 2015/0012703 A1* | 1/2015 | Ashok | G06F 8/60 |
| | | | 711/114 |

* cited by examiner

SYSTEMS AND METHODS FOR PERFORMING OPERATIONS ON RESTRICTED MOBILE COMPUTING PLATFORMS

CROSS REFERENCE TO RELATED APPLICATION

This application claims priority to U.S. Provisional Application No. 62/087,228, titled "SYSTEMS AND METHODS FOR CLOUD-BASED MOBILE APP SCANS" and filed 3 Dec. 2014, the disclosure of which is incorporated, in its entirety, by this reference.

BACKGROUND

As mobile devices such as smart phones and tablets become increasingly common, so too does the likelihood that entities may seek to compromise a mobile device through the installation of spyware, adware, or other malicious applications. In some cases, users may wish to optimize the performance of their mobile devices. For example, a user may seek to optimize battery life by disabling or removing applications that consume power in excess of a certain threshold. On an unrestricted computing device, users may be able to run scanning software that detects malicious applications or optimizes performance directly on the computing device. Traditional implementations of such scanning applications typically require access to information regarding the current state of the computing device being scanned.

However, some mobile computing platforms (e.g., mobile operating systems and/or hardware platforms) may place limits on applications running on mobile devices. For example, a smart phone's operating system may sandbox applications from each other such that a given application is not allowed to see what other applications are installed on the smart phone. As such, it may be difficult or impossible for traditionally implemented applications to perform operations that scan or modify a mobile device on restricted mobile computing platforms. Accordingly, the instant disclosure identifies and addresses a need for additional and improved systems and methods for performing operations on restricted mobile computing platforms.

SUMMARY

As will be described in greater detail below, the instant disclosure describes various systems and methods for performing operations on restricted mobile computing platforms by accessing a synchronization profile from a synchronization service linked to a mobile device and performing an analogous operation on the synchronization profile to indirectly perform the operation on the mobile device. In one example, a method for performing operations on restricted mobile computing platforms may include (1) receiving a request to perform an operation on a mobile device, (2) requesting, in response to the request, access to a synchronization profile of the mobile device that represents the current state of the mobile device from a cloud-based synchronization service that stores synchronization profiles for mobile devices, (3) receiving, from the cloud-based synchronization service, access to the synchronization profile, and (4) performing the operation on the mobile device by performing an analogous operation on the synchronization profile. In some embodiments, the operation may require access to a current state of the mobile device, and a mobile computing platform of the mobile device may place a limitation on an ability of third-party software to (a) inspect the current state of the mobile device, (b) modify the current state of the mobile device, and/or (c) execute resource-intensive (e.g., processor-intensive) operations via the mobile device. In at least one embodiment, the method may further include reporting the results of the analogous operation to a user of the mobile device.

In some embodiments, the cloud-based synchronization service may require a valid user authentication before the cloud-based synchronization service will grant access to the synchronization profile. In such embodiments, requesting access to the synchronization profile may include providing a set of user-supplied credentials to the cloud-based synchronization service as the valid user authentication.

In one example, the steps of requesting access to the synchronization profile, receiving access to the synchronization profile, and performing the analogous operation on the synchronization profile may be performed by a cloud-based security service that is separate and distinct from the cloud-based synchronization service. In another example, the mobile device may perform the steps of requesting access to the synchronization profile, receiving access to the synchronization profile, and performing the analogous operation on the synchronization profile.

In some embodiments, the synchronization profile may include an application binary file that corresponds to an application installed on the mobile device. In other embodiments, the synchronization profile may include a backup image of the mobile device.

In some examples, the analogous operation may include (1) using the synchronization profile to inspect the current state of the mobile device and/or (2) using the synchronization profile to modify the current state of the mobile device. In some examples, using the synchronization profile to inspect the current state of the mobile device may include using the synchronization profile to scan the mobile device for (1) malicious software, (2) software that does not adhere to a privacy standard, (3) software that consumes a resource in excess of a threshold, and/or (4) software that performs an undesirable function. In some examples, using the synchronization profile to modify the current state of the mobile device may include (1) using the synchronization profile to add software to the mobile device, (2) using the synchronization profile to remove software from the mobile device, and/or (3) using the synchronization profile to wipe data from the mobile device.

In one embodiment, a system for implementing the above-described method may include (1) a reception module, stored in memory, that receives a request to perform an operation on a mobile device, (2) a requesting module, stored in memory, that requests, from a cloud-based synchronization service that stores synchronization profiles for mobile devices, access to a synchronization profile of the mobile device that represents the current state of the mobile device, (3) an accessing module, stored in memory, that receives, from the cloud-based synchronization service, access to the synchronization profile, (4) an operating module, stored in memory, that performs the operation on the mobile device by performing an analogous operation on the synchronization profile, and (5) at least one physical processor configured to execute the reception module, the requesting module, the accessing module and the operating module. In some examples, the operation may require access to a current state of the mobile device, and a mobile computing platform of the mobile device may place a limitation on an ability of third-party software to (a) inspect the current state of the mobile device, (b) modify the current state of the mobile device, and/or (c) execute resource-intensive operations via the mobile device.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a request to perform an operation on a mobile device, (2) request, in response to the request, access to a synchronization profile of the mobile device that represents the current state of the mobile device from a cloud-based synchronization service that stores synchronization profiles for mobile devices, (3) receive, from the cloud-based synchronization service, access to the synchronization profile, and (4) perform the operation on the mobile device by performing an analogous operation on the synchronization profile. In some examples, the operation may require access to a current state of the mobile device, and a mobile computing platform of the mobile device may place a limitation on an ability of third-party software to (a) inspect the current state of the mobile device, (b) modify the current state of the mobile device, and/or (c) execute resource-intensive operations via the mobile device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
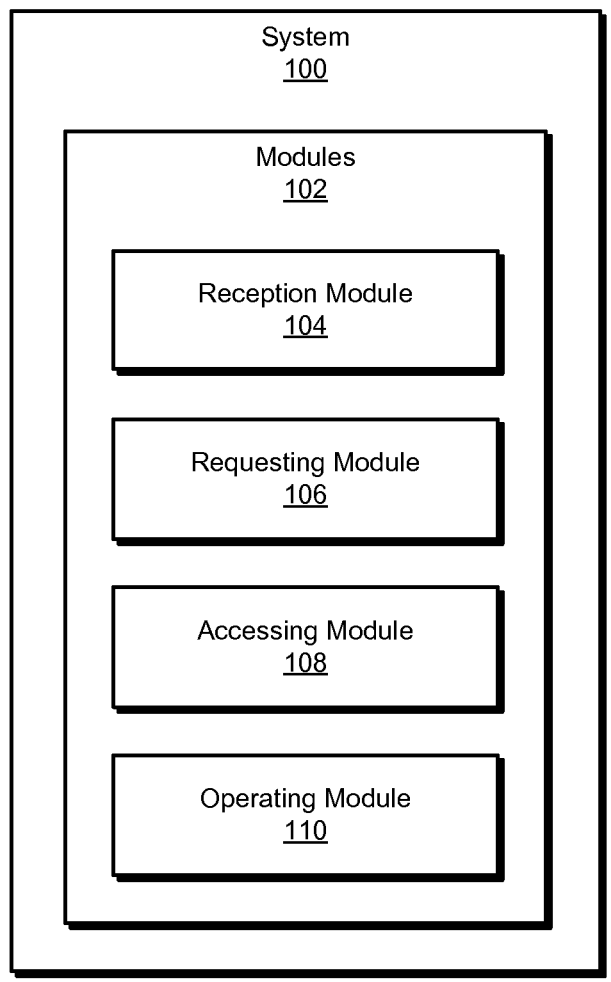
FIG. 1 is a block diagram of an exemplary system for performing operations on restricted mobile computing platforms.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for performing operations on restricted mobile computing platforms. As will be explained in greater detail below, by performing operations on a synchronization profile of a mobile device that is stored and maintained by a cloud-based synchronization service, the systems and methods disclosed herein may effectively circumvent restrictions imposed on applications running on the mobile device that may prevent the applications from performing similar operations directly on the mobile device. In some circumstances, applications running on a mobile device may be prevented from directly scanning the mobile device to evaluate performance, identify unwanted software, and/or remove unwanted software. In these circumstances, by performing operations on a synchronization profile of the mobile device, the systems and methods disclosed herein may be able to indirectly scan the mobile device to evaluate performance, identify unwanted software, and/or remove unwanted software.

Figure 2:
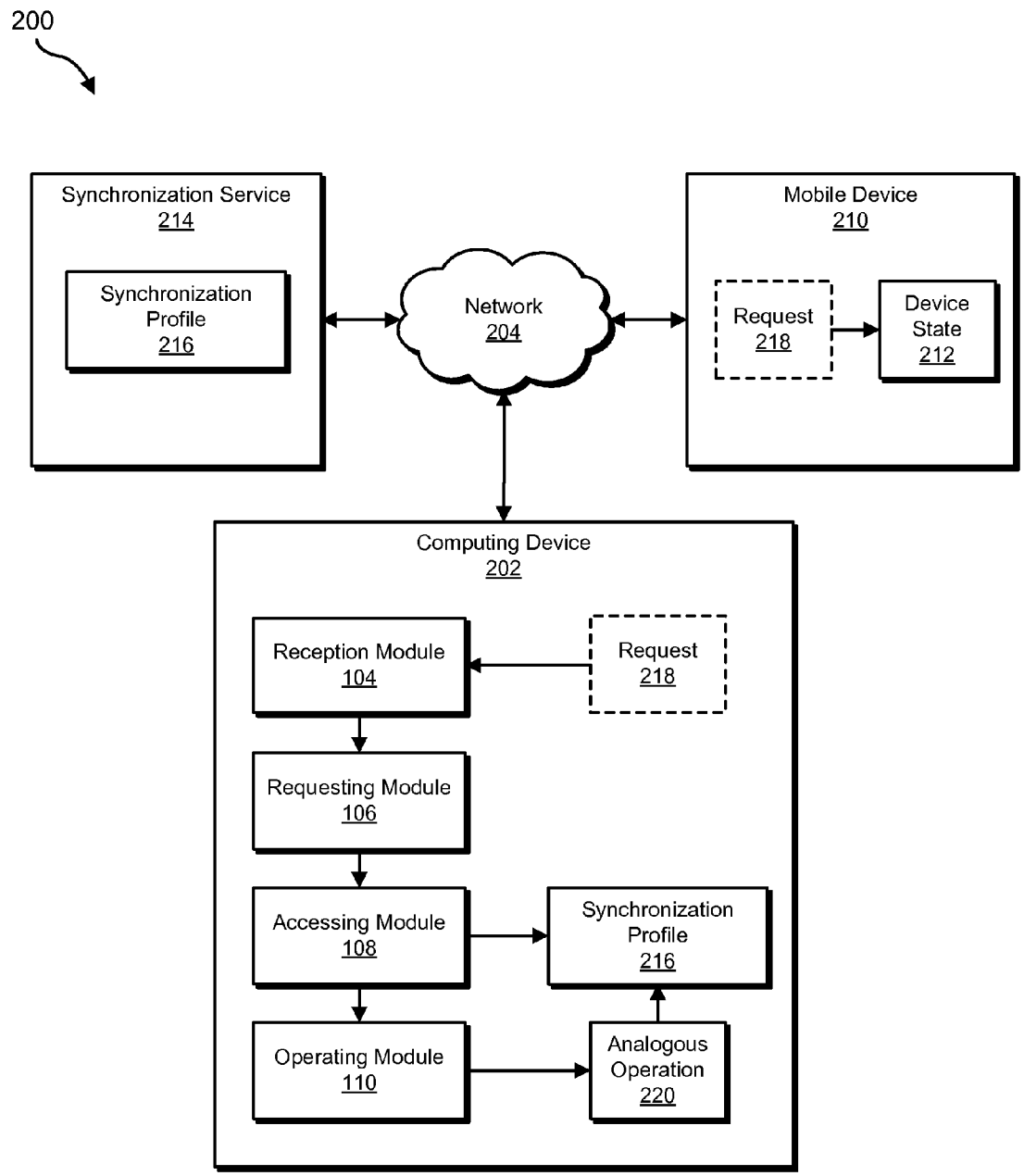
FIG. 2 is a block diagram of an additional exemplary system for performing operations on restricted mobile computing platforms.
Figure 3:
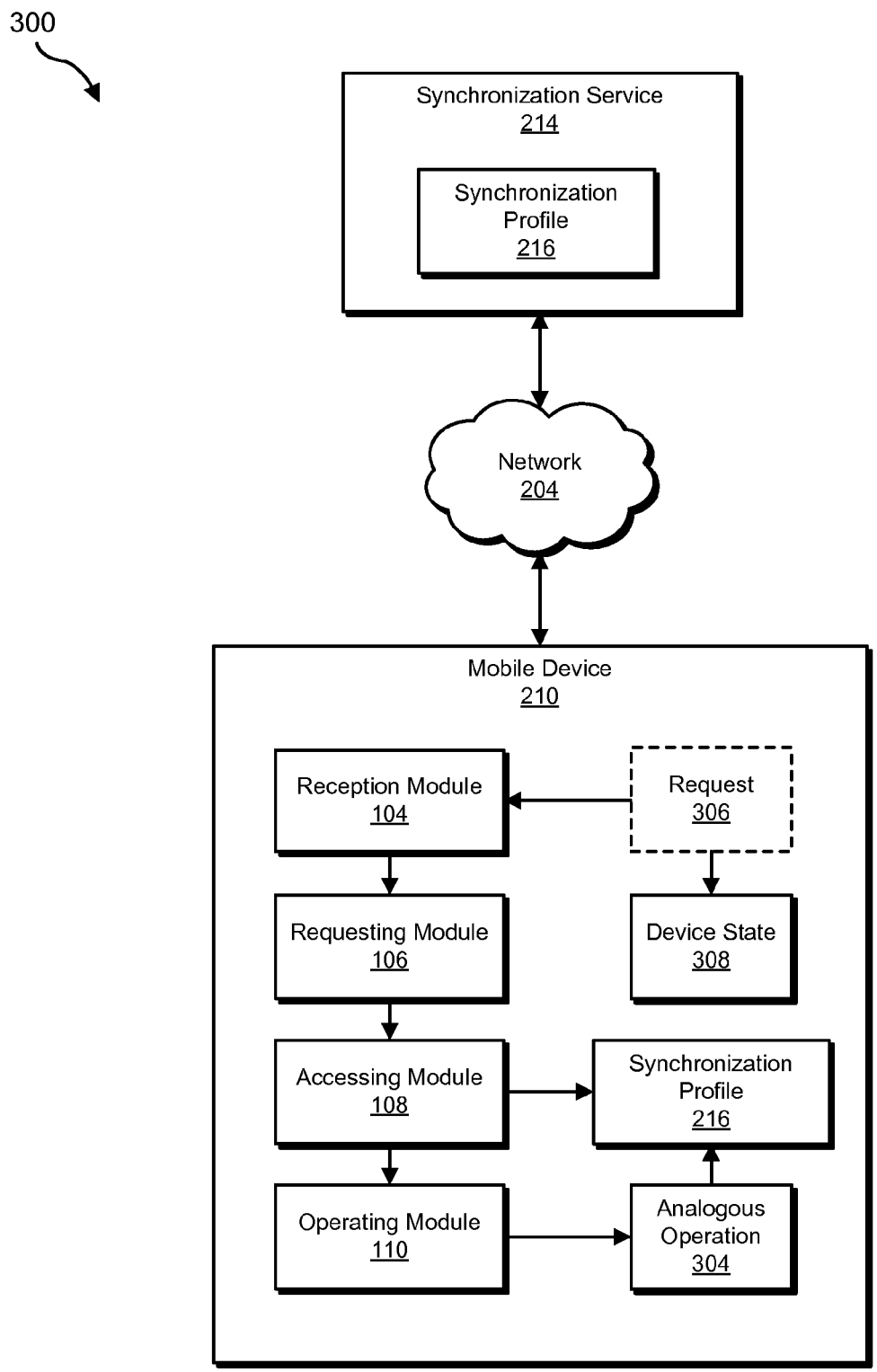
FIG. 3 is a block diagram of an additional exemplary system for performing operations on restricted mobile computing platforms.

The following will provide, with reference to FIGS. 1, 2, and 3, detailed descriptions of exemplary systems for performing operations on restricted mobile computing platforms. Detailed descriptions of corresponding computer-implemented methods will also be provided in connection with FIG. 4. Detailed descriptions of an exemplary system for modifying the state of a mobile device through the use of a synchronization profile will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for performing operations on restricted mobile computing platforms. As illustrated in this figure, exemplary system 100 may include one or more modules 102 for performing one or more tasks. For example, and as will be explained in greater detail below, exemplary system 100 may include a reception module 104 that may receive a request to perform an operation on a mobile device. Exemplary system 100 may also include a requesting module 106 that may request, from a cloud-based synchronization service that stores synchronization profiles for mobile devices, access to a synchronization profile of the mobile device that represents the current state of the mobile device. Exemplary system 100 may further include an accessing module 108 that receives access to the synchronization profile from the synchronization service. Exemplary system 100 may additionally include an operating module 110 that may perform the operation on the mobile device by performing an analogous operation on the synchronization profile. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), the devices illustrated in FIG. 3 (e.g., mobile device 210), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a synchronization service 214 and a mobile device 210 via a network 204. In one example, computing device 202 may be programmed with one or more of modules 102.

In one embodiment, one or more of modules 102 from FIG. 1 may, when executed by at least one processor of computing device 202, enable computing device 202 to circumvent limitations imposed by a mobile computing platform without any of modules 102 running on the mobile device. For example, and as will be described in greater detail below, reception module 104 may receive a request 218 to perform an operation on mobile device 210. Requesting module 106 may request access to a synchronization profile 216 of mobile device 210 that represents device state 212 of mobile device 210 from a synchronization service 214 that stores synchronization profile 216 for mobile device 210. Accessing module 108 may receive access to synchronization profile 216 from synchronization service 214. Operating module 110 may perform the operation on mobile device 210 by performing an analogous operation 220 on synchronization profile 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. In some examples, computing device 202 may represent a portion of a cloud-based security service that is separate and distinct from synchronization service 214. For example, computing device 202 may represent a portion of a cloud-based security service that is owned and operated by an entity that is separate and distinct from the entity that owns and operates synchronization service 214. In some examples, computing device 202 may represent a cloud-based security service that maintains a web portal that allows users to submit operation requests to the cloud-based security service. In other examples, computing device 202 may represent a personal computer that is separate and distinct from synchronization service 214. For example, computing device 202 may represent a personal computer capable of executing a personal security application that includes modules 102.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202, synchronization service 214, and mobile device 210.

Synchronization service 214 generally represents any service, application, or server that manages synchronization profiles for multiple mobile devices. In some examples and as will be discussed in greater detail below, a synchronization service may be a cloud-based service that provides synchronization functionality for mobile devices over a series of networks. Examples of synchronization service 214 include, without limitation, application servers and database servers configured to provide various synchronization services and/or run certain software applications.

Mobile device 210 generally represents any type or form of computing device capable of reading computer-executable instructions. Examples of mobile device 210 include, without limitation, smart phones, laptops, tablets, cellular phones, Personal Digital Assistants (PDAs), multimedia players, embedded systems, wearable devices (e.g., smart watches, smart glasses, etc.), portable gaming consoles, combinations of one or more of the same, exemplary computing system 610 in FIG. 6, or any other suitable computing device. In some examples, a mobile computing platform (e.g., a mobile operating system and/or a hardware platform) of mobile device 210 may place a limitation on the ability of third-party software installed on mobile device 210 to inspect a device state 212 of mobile device 210, modify device state 212, or execute resource-intensive operations via mobile device 210.

All or a portion of exemplary system 100 may alternatively represent portions of exemplary system 300 in FIG. 3. As shown in FIG. 3, system 300 may include a mobile device 210 in communication with a synchronization service 214 via a network 204. In one example, mobile device 210 may be programmed with one or more of modules 102. In one embodiment, one or more of modules 102 from FIG. 1 may, when executed by at least one processor of mobile device 210, enable mobile device 210 to indirectly perform operations on mobile device 210 in a way that circumvents limitations imposed by a mobile computing platform of mobile device 210. For example, and as will be described in greater detail below, reception module 104 may receive a request 306 to perform an operation on device state 308 that represents the state of mobile device 210. In response to receiving the request, requesting module 106 may request access to synchronization profile 216 from synchronization service 214. Accessing module 108 may receive access to synchronization profile 216 from synchronization service 214. Operating module 110 may fulfill request 306 by performing an analogous operation 304 on synchronization profile 216.

Figure 4:
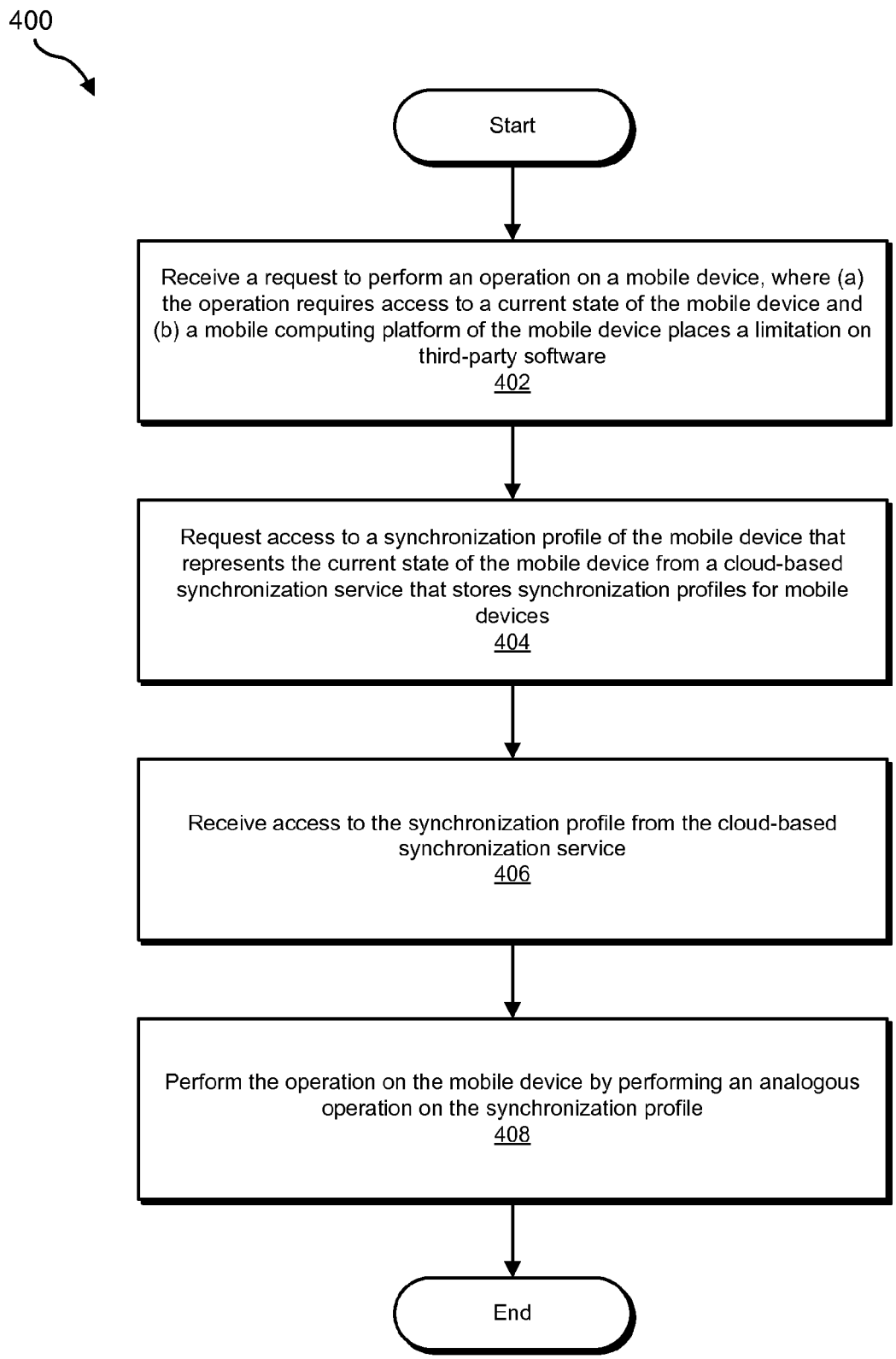
FIG. 4 is a flow diagram of an exemplary method for performing operations on restricted mobile computing platforms.

FIG. 4 is a flow diagram of an exemplary computer-implemented method 400 for performing operations on restricted mobile computing platforms. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, system 300 in FIG. 3, computing system 610 in FIG. 6, and/or portions of exemplary network architecture 700 in FIG. 7.

As illustrated in FIG. 4, at step 402, one or more of the systems described herein may receive a request to perform an operation on a mobile device, where the operation requires access to the current state of the mobile device and a mobile computing platform of the mobile device places a limitation on the ability of third-party software to inspect the current state of the mobile device, modify the current state of the mobile device, or execute resource-intensive operations via the mobile device. For example, reception module 104 may, as part of computing device 202 in FIG. 2, receive request 218 to perform an operation on mobile device 210. As previously described, a mobile computing platform of mobile device 210, such as an operating system, may limit the ability of software installed on mobile device 210 to execute certain operations directly on mobile device 210.

Reception module 104 may receive requests to perform a variety of operations on mobile devices. In general, reception module 104 may receive requests to perform (1) actions that interact with and/or require access to the current state of a mobile device and/or (2) actions that are difficult or impossible for software installed on the mobile device to perform as a result of a mobile computing platform of the mobile device limiting the ability of the software to inspect the current state of the mobile device, modify the current state of the mobile device, or execute resource-intensive operations via the mobile device.

Reception module 104 may receive requests to perform operations on mobile devices in a variety of contexts. In one example, reception module 104 may receive a request to perform an operation on a mobile device as part of a computing device that is separate and distinct from the mobile device. For example, reception module 104 may, as part of computing device 202 in FIG. 2, receive a request to perform an operation on mobile device 210. In some examples, reception module 104 may receive a request to perform an operation on a mobile device through a web portal that is hosted by a computing device that is separate and distinct from the mobile device that allows users of the mobile device to submit operation requests.

In some examples, reception module 104 may receive a request to perform an operation on a mobile device from or as part of a client application installed and executing on the mobile device. For example, reception module 104 may, as part of a client application installed and executing on mobile device 210 in FIG. 3, receive a request to perform an operation on mobile device 210. In some examples, reception module 104 may receive a request to perform an operation on a mobile device through direct user intervention, such as a user manually starting a scan function of a digital security application installed on the mobile device. In other examples, reception module 104 may receive a request to perform an operation on a mobile device that has been automatically generated by a digital security application installed on the mobile device.

In some examples, reception module 104 may receive requests to perform operations that include inspecting the current state of a mobile device. For example, reception module 104 may receive a request to scan the mobile device for malicious software, software that does not adhere to a privacy standard, software that consumes resources in excess of a predetermined threshold, or software that performs an undesirable function (e.g., spyware). In another example, reception module 104 may receive a request to locate the mobile device and/or identify another attribute of the mobile device.

In other examples, reception module 104 may receive requests to perform operations that include modifying the current state of the mobile device. For example, reception module 104 may receive a request to install applications to the mobile device or remove applications from the mobile device. In further examples, reception module 104 may receive requests to perform operations that include executing a resource-intensive function. For example, reception module 104 may receive a request to perform an operation on a mobile device that requires excessive system resources (e.g., processor, memory, and/or network resources) such that other operations are impaired in their ability to execute while the operation is being performed (e.g., executing the operation may cause the system to stall and be unable to process further user input).

As indicated above, reception module 104 may receive requests to perform operations that may be restricted by a mobile computing platform of a mobile device such that the operations cannot be completely or easily executed directly on the mobile device. As used herein, the term "mobile computing platform" generally refers to a software or hardware environment that is designed to run or execute various pieces of software on a mobile device. Examples of mobile computing platforms include, without limitation, physical hardware, browsers, software frameworks, virtual machines, operating systems, or any other suitable environment designed to run or execute various pieces of software on a mobile device. In some examples, a mobile computing platform such as an operating system may sandbox or isolate applications from each other, limiting the applications' ability to access and/or modify information about the mobile device or other applications on the mobile device. In other examples, a mobile computing platform such as processor hardware may limit the ability of the mobile device to execute processor-intensive operations. Moreover, processing resources such as battery power or Wi-Fi bandwidth may further limit the ability of an application to execute an operation. As will be explained in greater detail below, although a mobile computing platform may restrict the operations that may be executed on a mobile device, one or more of the systems described herein may be able to circumvent some or all of the restrictions by executing, on the mobile device or a remote computing device, an analogous operation on a synchronization profile of the mobile device.

Returning to FIG. 4 at step 404, one or more of the systems described herein may request access to a synchronization profile of the mobile device that represents the current state of the mobile device from a cloud-based synchronization service that stores synchronization profiles for mobile devices. For example, requesting module 106 may, as part of computing device 202 in FIG. 2, request access to synchronization profile 216 from synchronization service 214. In some examples, synchronization profile 216 may include information that indicates a current state (illustrated as device state 212) of mobile device 210.

The term "synchronization profile," as used herein, generally refers to a digital data object that is used to reflect or store some or all of the current state of a mobile device (e.g., what data is stored on the mobile device, what applications are stored on the mobile device, settings of the mobile device, and/or attributes of the mobile device). A synchronization profile of a mobile device may take a variety of forms. In some examples, a synchronization profile may contain a list of application identifiers that identify applications that are installed on the mobile device. In other examples, a synchronization profile may include binary files that correspond to applications installed on the mobile device. In further examples, a synchronization profile may include a complete backup image of the mobile device.

In some examples, the actual state of a mobile device may be correlated with a state of the mobile device that is reflected in a synchronization profile of the mobile device such that a change in one is reflected in the other. For example, deleting an application from the mobile device may cause the application to be removed from the synchronization profile. Similarly, installing an application on the mobile device may cause a corresponding element to be added to the synchronization profile. Moreover, changing the synchronization profile may cause a similar change to be reflected on the mobile device. For example, removing an application from the synchronization profile may cause the corresponding application to be removed from the mobile device. As a further example and with reference to FIG. 2, changing synchronization profile 216 may effect an analogous change in device state 212.

In some examples, information exchange between a mobile device and a corresponding synchronization profile may be handled by a synchronization service. The term "synchronization service," as used herein, generally refers to any service, application, or server that manages synchronization profiles for multiple mobile devices. Examples of synchronization services may include, without limitation, APPLE's ICLOUD service and GOOGLE's ANDROID BACKUP SERVICE. In some examples, a synchronization service may be a cloud-based service that provides synchronization functionality for mobile devices over a series of networks. In some examples, a synchronization service may coordinate the state of a mobile device with the state of a synchronization profile such that the state of the mobile device reflects the state of the synchronization profile, and vice versa. In this manner, changes that are enacted on either the mobile device or the synchronization profile may be reflected in the other. In this manner, synchronization services may allow a user to perform actions such as restoring previously purchased applications to a new device. In some examples, a synchronization service may act directly on a mobile device. In other examples, a synchronization service may act on a mobile device through client applications.

In some examples, a synchronization profile and a mobile device may require a synchronization event to update the synchronization profile and the mobile device with any changes made to the other, the synchronization profile may nevertheless accurately depict the actual state of the mobile device. The term "current state," as used herein, generally refers to a representation of a mobile device that accurately represents an as-is state or a most recent state of the mobile device.

Returning to FIG. 4, requesting module 106 may request access to synchronization profiles in a variety of ways. In some examples, requesting module 106 may emulate a client mobile device that is retrieving an associated synchronization profile. In other examples, requesting module 106 may request the synchronization profile through an application program interface (API) of a cloud-based synchronization service that would be called by a new mobile device seeking to access the synchronization profile.

In some examples, a cloud-based synchronization service may require a valid user authentication before the cloud-based synchronization service will grant access to the synchronization profile of a mobile device. In these examples, requesting module 106 may prompt a user of the mobile device for login credentials (e.g., username and password) and provide the credentials to the cloud-based synchronization service. Requesting module 106 may receive credentials from a user in a variety of ways, such as through a digital keychain or by enabling the user to manually enter their credentials into a dialogue window.

One or more of the systems described herein may receive access to the synchronization profile in response to requesting access to the synchronization profile. As illustrated in FIG. 4 at step 406, one or more of the systems described herein may receive, from the cloud-based synchronization service, access to the synchronization profile. For example, accessing module 108 may, as part of computing device 202 in FIG. 2, receive access to synchronization profile 216 from synchronization service 214.

Accessing module 108 may receive access to synchronization profile 216 in a variety of ways. In some examples, accessing module 108 may receive a copy of a synchronization profile from a synchronization service. For example, accessing module 108 may receive synchronization profile 216 from synchronization service 214. In other examples, accessing module 108 may receive permission to modify a synchronization profile that is stored on a synchronization service via an API of the synchronization service. For example, accessing module 108 may receive permission to modify synchronization profile 216 on synchronization service 214. In further examples, accessing module 108 may receive permission to provide instructions to a synchronization service that cause the synchronization service to modify the synchronization profile. For example, accessing module 108 may receive permission to provide instructions to synchronization service 214 that cause synchronization service 214 to modify synchronization profile 216. As will be explained below, one or more of the systems described herein may perform an operation on a synchronization profile in order to cause a change to the mobile device.

Returning to FIG. 4 at step 408, one or more of the systems described herein may perform the operation on the mobile device by performing an analogous operation on the synchronization profile. For example, operating module 110 may, as part of computing device 202 in FIG. 2, perform the operation on mobile device 210 by performing an analogous operation 220 on synchronization profile 216.

Operating module 110 may perform a variety of analogous operations on the synchronization profiles of mobile devices to indirectly perform the operations requested as part of step 402. As used herein, the term "analogous operation" generally refers to any operation that may be performed on a synchronization profile of a mobile device that may be performed in place of and/or that has the same effect as another operation executed directly on the mobile device. By performing analogous operations on the synchronization profiles of mobile devices, the systems and methods described herein may indirectly perform operations on mobile devices without executing code on the mobile devices and/or without requiring direct access to the current states of the mobile devices. As such, the systems and methods disclosed herein may effectively circumvent restrictions imposed on applications running on the mobile devices that may prevent the applications from executing certain operations directly on the mobile devices.

In one example, operating module 110 may perform an operation on a mobile device that requires inspection of the current state of the mobile device by performing an analogous operation on a synchronization profile of the mobile device that uses the synchronization profile to inspect the current state of the mobile device. For example, operating module 110 may use a synchronization profile of a mobile device to scan the mobile device for malicious applications, applications that do not adhere to a privacy standard, applications that consume resources in excess of a predetermined threshold, or applications that perform an undesirable function. In this example, applications present on the mobile device may be reflected by application references or application binaries contained in or accessible via the synchronization profile such that operating module 110 may determine if the mobile device contains applications that are malicious, do not adhere to a privacy standard, consume excess resources, and/or perform an undesirable function based on the application information contained in the synchronization profile. In another example, operating module 110 may use a synchronization profile of a mobile device to identify an attribute of the mobile device (e.g., a location of the mobile device). In this example, the synchronization profile of the mobile device may store information that indicates various attributes of the mobile device.

In other examples, operating module 110 may perform a resource-intensive operation on a mobile device through the performance of an analogous operation on a synchronization profile of the mobile device. Mobile devices generally have limited resources such as battery life and/or processing power. Operating module 110 may be able to execute a resource-intensive operation on a mobile device by performing an analogous operation on a synchronization profile of the mobile device in an environment with more resources than the mobile device (e.g., a remote server or personal computer). For example, a user may wish to perform a complex resource-use analysis on their mobile device. However, users generally expect a highly responsive user interface from their mobile applications and the limited processing power of the mobile device may cause such analysis operations to take a prohibitive amount of time. Because the synchronization profile represents a current state of the mobile device, operating module 110 may circumvent this limitation by using a system with more resources than the mobile device to perform the analysis on the synchronization profile and report the results to the user.

In further examples, operating module 110 may perform an operation on a mobile device that modifies the current state of the mobile device by performing an analogous operation that modifies the current state of the mobile device reflected in a synchronization profile of the mobile device. Modifying the current state of the mobile device may include adding or removing applications or data from the mobile device. In examples where operating module 110 is executed by the mobile device, operating module 110 may be limited by a mobile computing platform of the mobile device in its ability to modify other applications or data on the mobile device. However, operating module 110 may circumvent this limitation by modifying a synchronization profile of the mobile device. As will be discussed in connection with FIG. 5, operating module 110 may induce a change in the state of a mobile device by acting on a synchronization profile of the mobile device.

Figure 5:
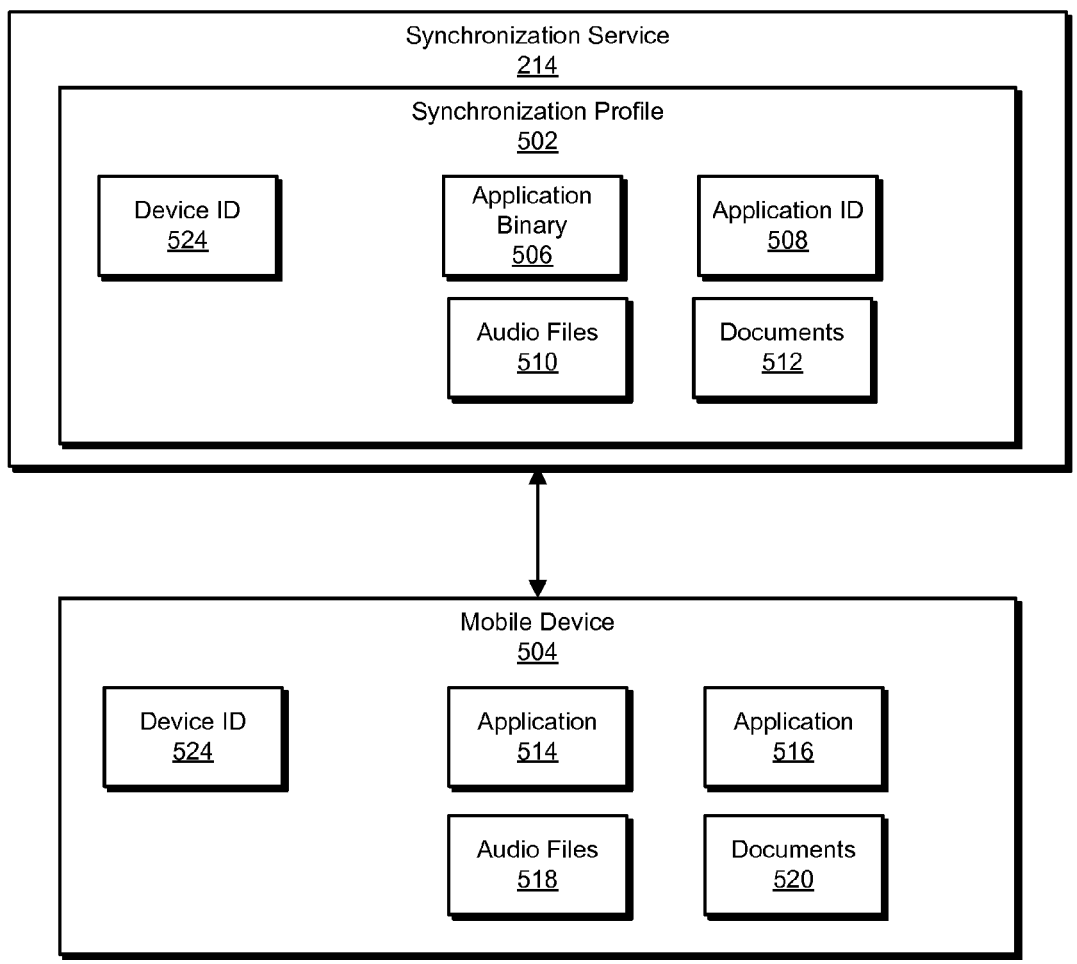
FIG. 5 is a block diagram of an exemplary computing system for altering the state of a mobile device through the use of a synchronization profile.

FIG. 5 is a block diagram of an exemplary system for altering the state of a mobile device through the use of a synchronization profile. As shown, a synchronization profile 502 of mobile device 504 may be maintained on synchronization service 214. In this example, synchronization profile 502 may be accessible to operating module 110. As shown in FIG. 5, mobile device 504 may contain applications 514 and 516, audio files 518, and documents 520. These items may be reflected in synchronization profile 502 by application binary 506, application identifier (ID) 508, audio files 510, and documents 512, respectively. In the example illustrated in FIG. 5, operating module 110 may remove application 514 from mobile device 504 by removing application binary 506 from synchronization profile 502 and then by letting synchronization service 214 synchronize mobile device 504 with synchronization profile 502.

In some examples, operating module 110 may report a result of an analogous operation to a user of a mobile device. Operating module 110 may deliver a report to the user in a variety of ways. In some examples, operating module 110 may deliver the report through a web interface that the user originally connected to as part of initiating request 218. In other examples, operating module 110 may deliver the report by e-mail or text message. In further examples, operating module 110 may display the report on the screen of the mobile device. As a specific example illustrated in FIG. 2, operating module 110 may report the results of analogous operation 220 to the user that initiated request 218.

As described above, by performing operations on a synchronization profile of a mobile device that is stored and maintained by a cloud-based synchronization service, the systems and methods disclosed herein may effectively circumvent restrictions imposed on applications running on the mobile device that may prevent the applications from performing similar operations directly on the mobile device. In some circumstances, applications running on a mobile device may be prevented from directly scanning the mobile device to evaluate performance, identify unwanted software, and/or remove unwanted software. In these circumstances, by performing operations on a synchronization profile of the mobile device, the systems and methods disclosed herein may be able to indirectly scan the mobile device to evaluate performance, identify unwanted software, and/or remove unwanted software.

Figure 6:
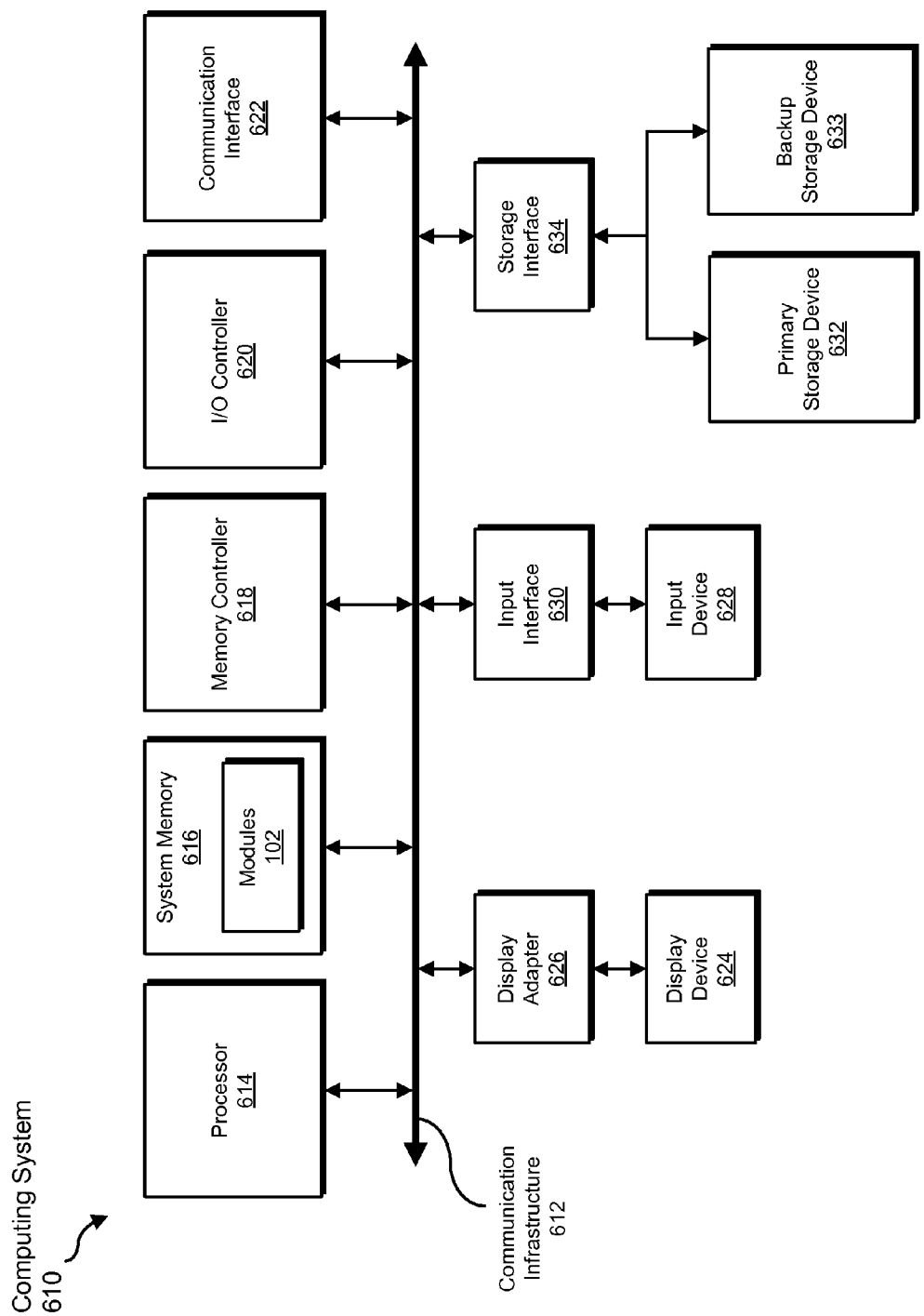
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 4). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 642 and a backup storage device 643 coupled to communication infrastructure 612 via a storage interface 634. Storage devices 642 and 643 generally represent any type or form of storage device or medium capable of storing data and/or other computer-readable instructions. For example, storage devices 642 and 643 may be a magnetic disk drive (e.g., a so-called hard drive), a solid state drive, a floppy disk drive, a magnetic tape drive, an optical disk drive, a flash drive, or the like. Storage interface 644 generally represents any type or form of interface or device for transferring data between storage devices 642 and 643 and other components of computing system 610.

In certain embodiments, storage devices 642 and 643 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 642 and 643 may also include other similar structures or devices for allowing computer software, data, or other computer-readable instructions to be loaded into computing system 610. For example, storage devices 642 and 643 may be configured to read and write software, data, or other computer-readable information. Storage devices 642 and 643 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 642 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
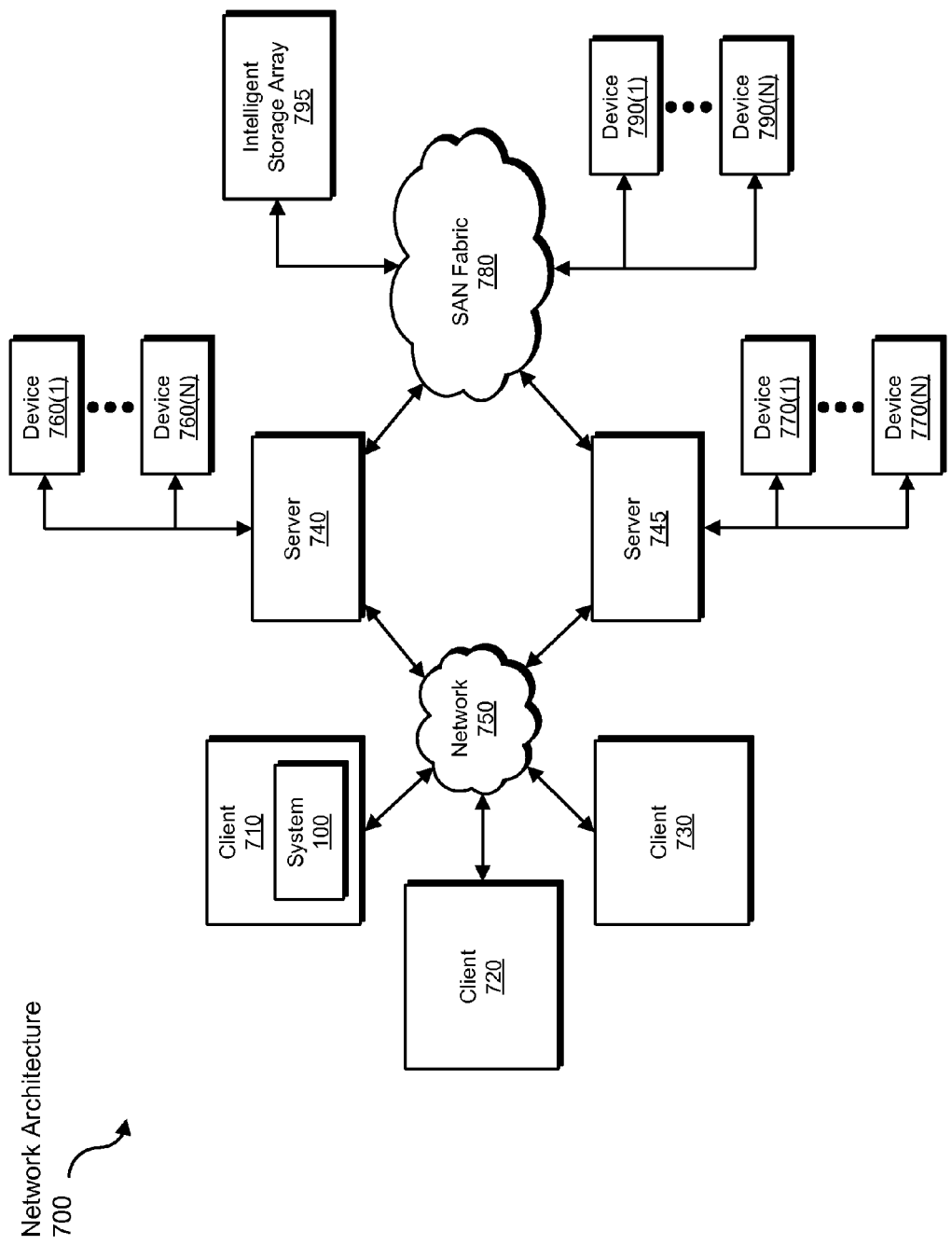
FIG. 7 is a block diagram of an exemplary computing network capable of implementing one or more of the embodiments described and/or illustrated herein.

FIG. 7 is a block diagram of an exemplary network architecture 700 in which client systems 710, 720, and 740 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 4). All or a portion of network architecture 700 may also be used to perform and/or be a means for performing other steps and features set forth in the instant disclosure.

Client systems 710, 720, and 740 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 740 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 740 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 740 and network 750. Client systems 710, 720, and 740 may be able to access information on server 740 or 745 using, for example, a web browser or other client software. Such software may allow client systems 710, 720, and 740 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 740 over network 750.

As detailed above, computing system 610 and/or one or more components of network architecture 700 may perform and/or be a means for performing, either alone or in combination with other elements, one or more steps of an exemplary method for performing operations on restricted mobile computing platforms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may receive a request to modify the state of a mobile device, translate the request into an action, convert the action into an analogous action, request a synchronization profile that represents the current state of the mobile device, perform the analogous action on the synchronization profile, store the results of the analogous action to memory, and/or provide the results of the transformation to a synchronization service. Furthermore, one or more of the modules described herein may output a result of the transformation to a display, provide the results of the transformation to a user through an e-mail or text message, and/or store the results of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing operations on restricted mobile computing platforms, at least a portion of the method being performed by a computing device comprising at least one processor, the method comprising:
   receiving a request to perform an operation on a mobile device, wherein:
      the operation requires access to a current state of the mobile device;
      a mobile computing platform of the mobile device isolates third-party software applications from each other and imposes a limitation on an ability of the third-party software applications to perform at least one of:
         accessing information about other applications installed on the mobile device;
         modifying information about other applications installed on the mobile device; and
         modifying other applications installed on the mobile device; and
      the operation cannot be performed directly on the mobile device due to the limitation imposed on the third-party software applications by the mobile computing platform;
   in response to the request:
      requesting, from a cloud-based synchronization service that maintains synchronization profiles for mobile devices, access to a synchronization profile of the mobile device that describes and is correlated to the current state of the mobile device, wherein the cloud-based synchronization service actively correlates the synchronization profile to the current state of the mobile device by:
         in response to detecting changes made to the current state of the mobile device, automatically modifying the synchronization profile to reflect the changes made to the current state of the mobile device; and
         in response to detecting changes made to the synchronization profile, automatically modifying the current state of the mobile device to reflect the changes made to the synchronization profile;
      receiving, from the cloud-based synchronization service, access to the synchronization profile; and
      performing an analogous operation on the synchronization profile that circumvents the isolation and the limitation imposed by the mobile computing platform and produces an intended effect of the operation on the mobile device.

2. The method of claim 1, wherein:
   the cloud-based synchronization service requires a valid user authentication before the cloud-based synchronization service will grant access to the synchronization profile; and
   requesting access to the synchronization profile comprises providing, as the valid user authentication, a set of user-supplied credentials to the cloud-based synchronization service.

3. The method of claim 1, wherein the steps of requesting access to the synchronization profile, receiving access to the synchronization profile, and performing the analogous operation on the synchronization profile are performed by a cloud-based security service that is separate and distinct from the cloud-based synchronization service.

4. The method of claim 1, wherein the mobile device performs the steps of requesting access to the synchronization profile, receiving access to the synchronization profile, and performing the analogous operation on the synchronization profile.

5. The method of claim 1, wherein the synchronization profile comprises an application binary file that corresponds to an application installed on the mobile device.

6. The method of claim 1, further comprising reporting a result of the analogous operation to a user of the mobile device.

7. The method of claim 1, wherein the analogous operation comprises at least one of:
   using the synchronization profile to inspect the current state of the mobile device; and
   using the synchronization profile to modify the current state of the mobile device.

8. The method of claim 7, wherein using the synchronization profile to inspect the current state of the mobile device comprises using the synchronization profile to scan the mobile device for at least one of:
   malicious software;
   software that does not adhere to a privacy standard;
   software that consumes a resource in excess of a threshold; and
   software that performs an undesirable function.

9. The method of claim 7, wherein using the synchronization profile to modify the current state of the mobile device comprises at least one of:
   using the synchronization profile to add software to the mobile device;
   using the synchronization profile to remove software from the mobile device; and
   using the synchronization profile to wipe data from the mobile device.

10. The method of claim 1, wherein the synchronization profile comprises a backup image of the mobile device.

11. A system for performing operations on restricted mobile computing platforms, the system comprising:
   a reception module, stored in memory, that receives a request to perform an operation on a mobile device, wherein:
      the operation requires access to a current state of the mobile device;
      a mobile computing platform of the mobile device isolates third-party software applications from each other and imposes a limitation on an ability of the third-party software applications to perform at least one of:
         accessing information about other applications on the mobile device;

modifying information about other applications installed on the mobile device; and
modifying other applications installed on the mobile device; and
the operation cannot be performed directly on the mobile device due to the limitation imposed on the third-party software applications by the mobile computing platform;
a requesting module, stored in memory, that requests, from a cloud-based synchronization service that maintains synchronization profiles for mobile devices, access to a synchronization profile of the mobile device that describes and is correlated to the current state of the mobile device, wherein the cloud-based synchronization service actively correlates the synchronization profile to the current state of the mobile device by:
in response to detecting changes made to the current state of the mobile device, automatically modifying the synchronization profile to reflect the changes made to the current state of the mobile device; and
in response to detecting changes made to the synchronization profile, automatically modifying the current state of the mobile device to reflect the changes made to the synchronization profile;
an accessing module, stored in memory, that receives, from the cloud-based synchronization service, access to the synchronization profile;
an operating module, stored in memory, that performs an analogous operation on the synchronization profile that circumvents the isolation and the limitation imposed by the mobile computing platform and produces an intended effect of the operation on the mobile device; and
at least one physical processor configured to execute the reception module, the requesting module, the accessing module, and the operating module.

12. The system of claim 11, wherein:
the cloud-based synchronization service requires a valid user authentication before the cloud-based synchronization service will grant access to the synchronization profile; and
the requesting module requests access to the synchronization profile by providing, as the valid user authentication, a set of user-supplied credentials to the cloud-based synchronization service.

13. The system of claim 11, wherein the requesting module, the accessing module, and the operating module are executed by a cloud-based security service that is separate and distinct from the cloud-based synchronization service.

14. The system of claim 11, wherein the requesting module, the accessing module, and the operating module are executed by the mobile device.

15. The system of claim 11, wherein the synchronization profile comprises an application binary file that corresponds to an application installed on the mobile device.

16. The system of claim 11, further comprising a reporting module, stored in memory, that reports a result of the analogous operation to a user of the mobile device.

17. The system of claim 11, wherein the analogous operation comprises at least one of:
using the synchronization profile to inspect the current state of the mobile device; and
using the synchronization profile to modify the current state of the mobile device.

18. The system of claim 17, wherein the operating module uses the synchronization profile to inspect the current state of the mobile device by using the synchronization profile to scan the mobile device for at least one of:
malicious software;
software that does not adhere to a privacy standard;
software that consumes a resource in excess of a threshold; and
software that performs an undesirable function.

19. The system of claim 17, wherein the operating module uses the synchronization profile to modify the current state of the mobile device by performing at least one of:
using the synchronization profile to add software to the mobile device;
using the synchronization profile to remove software from the mobile device; and
using the synchronization profile to wipe data from the mobile device.

20. A non-transitory computer-readable medium comprising one or more computer-readable instructions that, when executed by at least one processor of a computing device, cause the computing device to:
receive a request to perform an operation on a mobile device, wherein:
the operation requires access to a current state of the mobile device; and
a mobile computing platform of the mobile device isolates third-party software applications from each other and imposes a limitation on an ability of the third-party software applications to perform at least one of:
accessing information about other applications installed on the mobile device;
modifying information about other applications on the mobile device; and
modifying other applications installed on the mobile device; and
the operation cannot be performed directly on the mobile device due to the limitation imposed on the third-party software applications by the mobile computing platform;
in response to the request:
request, from a cloud-based synchronization service that maintains synchronization profiles for mobile devices, access to a synchronization profile of the mobile device that describes and is correlated to the current state of the mobile device, wherein the cloud-based synchronization service actively correlates the synchronization profile to the current state of the mobile device by:
in response to detecting changes made to the current state of the mobile device, automatically modifying the synchronization profile to reflect the changes made to the current state of the mobile device; and
in response to detecting changes made to the synchronization profile, automatically modifying the current state of the mobile device to reflect the changes made to the synchronization profile;
receive, from the cloud-based synchronization service, access to the synchronization profile; and
perform an analogous operation on the synchronization profile that circumvents the isolation and the limitation imposed by the mobile computing platform and produces an intended effect of the operation on the mobile device.

* * * * *